April 23, 1946.  M. ROSENBLATT  2,398,858
DISPLAY DEVICE AND HOUSEHOLD RACK
Filed Nov. 1, 1943  2 Sheets-Sheet 1
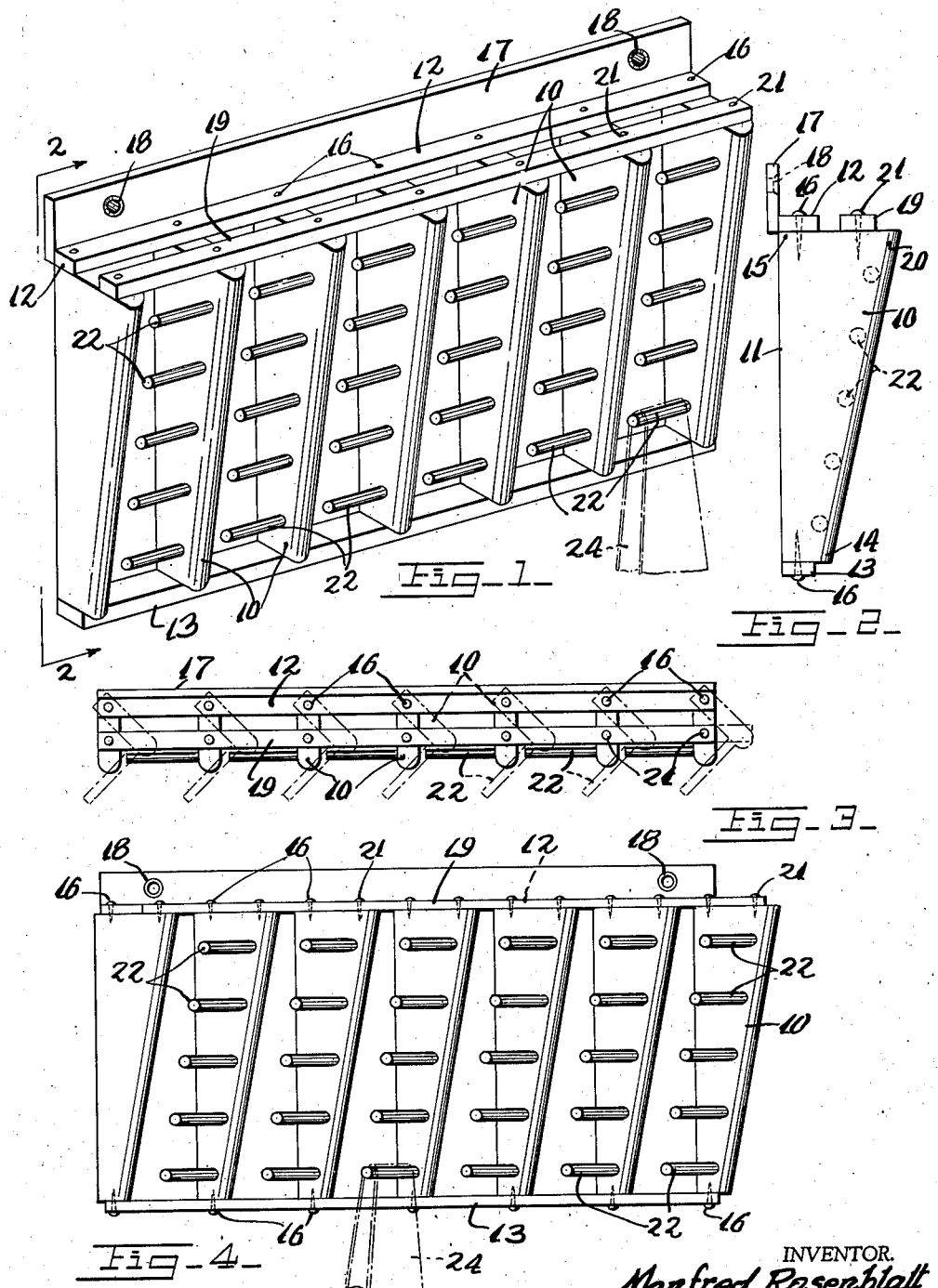
INVENTOR.
Manfred Rosenblatt
BY Zoltan Polachek
ATTORNEY

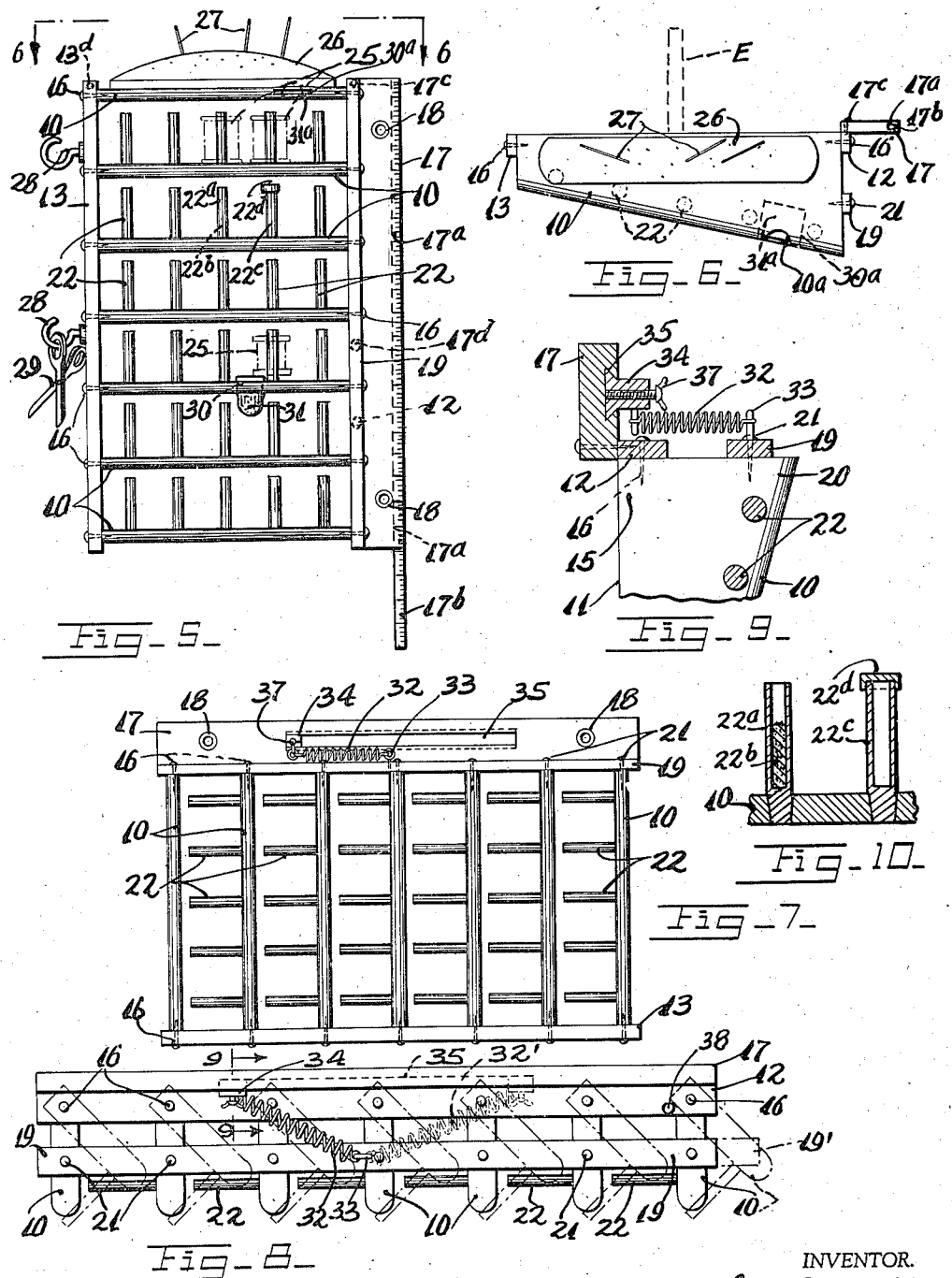

Patented Apr. 23, 1946

2,398,858

UNITED STATES PATENT OFFICE 2,398,858

DISPLAY DEVICE AND HOUSEHOLD RACK

Manfred Rosenblatt, Kew Gardens, N. Y.

Application November 1, 1943, Serial No. 508,492

5 Claims. (Cl. 211—96)

This invention relates to new and useful improvements in a display device and household rack.

More specifically, the invention proposes to characterize the new rack by a plurality of parallel and laterally spaced right angle triangularly shaped members having parallel altitudes disposed in a common plane and supported in a certain way so as to be movable to "open" and "closed" positions. The invention contemplates providing said members with a plurality of pegs or support elements disposed between adjacent faces and mounted on one of said faces so as to be extended or retracted in the open and closed positions of said members.

The invention proposes to support said members between a pair of superimposed support strips extending across and pivotally connected with the apexes and the right angle ends of the bases of said triangularly shaped members.

Still further it is proposed to provide means for attaching one of said support strips to a wall or other object for supporting the rack.

The invention further contemplates the provision of a strip extending across and pivotally connected with the acute angle end portions of the bases of said triangularly shaped members by which they may be moved in unison from closed to open positions, and vice versa.

The invention still further proposes to mount a plurality of utility objects on said rack, such as a pin cushion, hooks, scissors, razor, etc.

Still further the invention proposes to construct the rack of various sizes for various purposes. For example, a small size may be used as a necktie rack or for spools of thread. A larger size may be used to support towels, etc.

The invention proposes constructing said rack of various materials, such as wood, metal, ceramic materials, cardboard and the like.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of a display device and household rack constructed in accordance with this invention.

Fig. 2 is an end elevational view looking in the direction of the line 2—2 of Fig. 1.

Fig. 3 is a plan view of the rack shown in Fig. 1.

Fig. 4 is a front elevational view of the rack illustrated with the triangularly shaped members in an open position.

Fig. 5 is a front elevational view of a display device and household rack embodying another form of this invention.

Fig. 6 is a plan view looking in the direction of the line 6—6 of Fig. 5.

Fig. 7 is a front elevational view of still another display device and household rack constructed in accordance with still another form of this invention.

Fig. 8 is an enlarged detailed plan view of Fig. 7.

Fig. 9 is a fragmentary vertical sectional view taken on the line 9—9 of Fig. 8.

Fig. 10 is an enlarged sectional detailed view of a portion of Fig. 5.

The display device and household rack, according to this invention, includes a plurality of normally parallel and laterally spaced right angle triangularly shaped members 10 having their altitudes 11 disposed in a common plane and parallel to each other. A pair of superimposed support strips 12 and 13 extend across and are pivotally connected with the apexes 14 and the right angle ends 15 of the bases of said triangularly shaped members 10. These strips are pivotally connected as stated with small nails 16 or other similar elements.

The top support strip 12 is associated with means for attaching same to a wall or other object. This means is in the nature of an auxiliary strip 17 attached to the back edge of the said strip 12 and provided with several openings 18 for nails or other fastening elements. A strip 19 extends across and is pivotally connected with the acute angle and portions 20 of the bases of said triangularly shaped members 10. These pivotal connections are in the form of small nails 21 mounted upon the strip 19 and engaging the top edge portions of the members 10. This device may be supported on the wall or other objects by any other suitable arrangement.

A plurality of pegs 22 or support elements are disposed between adjacent faces of said triangularly shaped members 10 and are mounted on one of these faces. These pegs 22 extend to points close to the adjacent faces of adjacent members 10.

The operation of the display device and household rack may be best understood by examining Figs. 1-3 and noting that the article as illustrated is in a closed position. To open same it is merely necessary to shift the front edges of one or more of the members 10 laterally. Since the members 10 are connected together by the strip 19 they will move in unison. The members 10 may be moved to oblique positions, as indicated in Fig. 3, by the dot and dash lines, and as illustrated in Fig. 4 by the full lines. The pegs 22 are now extended forwards at oblique angles. This represents the open position of the rack. The rack may be used to support small articles such as neckties, schematically indicated by the dot and dash lines 24.

In Figs. 5 and 6 a modified form of display device and household rack is illustrated which distinguishes from the prior form in several respects. In the first place, it is disclosed turned around from a horizontal to a vertical position. In this position it may be used as a spool rack to support spools of thread, indicated by the dot and dash lines 25. Various utility objects may also be mounted on the rack. A pin cushion 26 is shown mounted upon the top face of the uppermost triangularly shaped member 10. Several pins and needles 27 are shown mounted on the pin cushion 26.

The support strip 13 is shown provided with several hooks 28 and supporting various kinds of articles. A pair of scissors 29 is shown supported on one of these hooks. One of the triangularly shaped members 10 is also illustrated formed with an opening 30 through which a thimble 31 is disposed and supported by its larger upper end. A pair of spools of thread are shown engaging against the upper end of the thimble 31 for removably holding it in position.

One of the triangularly shaped members 10 is formed with a slot 30ª to accommodate a safety razor blade 31ª or other sharp cutting blade for cutting threads at the exposed area 10ª.

A scale graduation 17ª is shown along the free edge of the strip 17. A sliding ruler 17ᵇ is provided in a dove-tail groove 17ᶜ in the strip member 17 so that it may be used as an extension ruler.

The strip 17 is shown to be pivotally held at 17ᶜ to the upper edge of the strip 12 and is provided with a removable screw or the like 17ᵈ so that when the screw is removed, the strip 17 may be swung from the vertical position to a horizontal position on its pivot 17ᶜ and then the screw 17ᵈ may be inserted through the strip 17 into the upper end of the strip 13 at 13ᵈ.

One or more of the pegs 22ª may be hollow and filled with suitable soft material 22ᵇ to act as a pin cushion. One of the hollow pegs 22ᶜ is shown to be provided with a suitable cup 22ᵈ so that it may be used as a pin receptacle.

In other respects this form of the invention is identical to the previous form and like parts are indicated by like reference numerals. However, it should be borne in mind that numerous other utility objects and articles may also be mounted on the rack.

In Figs. 7-9 still another form of the invention is disclosed which essentially distinguishes from the prior forms in the fact that it is provided with means for holding the right angle triangularly shaped members 10 in right angle or oblique positions in relation to each other. This means is characterized by a tension spring 32. One end of the tension spring 32 is attached to an eye element 33 mounted on the strip 19. The other end of the spring 32 is connected with a block 34 which is slidably mounted upon a groove 35 formed on the front face of the auxiliary strip 17.

The inner end of the block 34 is of dove-tailed shape, as shown in Fig. 9. The groove 35 is similarly shaped. A set screw 37 threadedly engages through the block 34 and is adapted to engage against the base of the groove 35 for locking the block 34 in selected positions. A stop peg 38 is mounted through the strip 12 and forms an abutment for one of the threadedly shaped members 10 for limiting pivoting of the members in one direction to their right angle positions. With the parts as illustrated by the full lines on the drawing, the spring 32 acts to urge and hold the triangularly shaped members 10 in their latter-mentioned positions.

If desired, the screw 37 may be loosened, the block 34 shifted to the right hand end of the groove 35 and fastened in this position. The spring 32 will now be directed in an opposite direction, indicated by the dot and dash lines 32′ in Fig. 8. It now will urge the strip 19 towards the right to the dot and dash position 19′. This causes the triangularly shaped members 10 to assume their oblique position, illustrated by the dot and dash lines in Fig. 8.

It is to be understood that the members 10 may be triangular or of any other desired shape. If they are not triangular the pegs 22 will be made of different lengths, those near the front are to be longer than those further back.

The lower support strip 13 may be entirely eliminated and then the members will be supported by the upper support strips 12 and 19.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A display device and household rack, comprising a plurality of parallel and laterally spaced right angle triangularly shaped members having parallel altitudes disposed in a common plane, a pair of superimposed support strips extending across and pivotally connected with the apexes and the right angle ends of the bases of said triangularly shaped members, means for attaching one of said support strips on a wall or other object, a strip extending across and pivotally connected with the acute angle end portions of the bases of said triangularly shaped members, a plurality of pegs or support elements disposed between adjacent faces of said triangularly shaped members and mounted on one of said faces, and means for holding said triangularly shaped members in right angle or oblique positions in relation with each other.

2. A display device and household rack, comprising a plurality of parallel and laterally spaced right angle triangularly shaped members having parallel altitudes disposed in a common plane, a pair of superimposed support strips extending across and pivotally connected with the apexes and the right angle ends of the bases of said triangularly shaped members, means for attaching one of said support strips on a wall or other object, a strip extending across and pivotally connected with the acute angle end portions of the bases of said triangularly shaped members, a plurality of pegs or support elements disposed between adjacent faces of said triangularly shaped members and mounted on one of said faces, and means for holding said triangularly shaped members in right angle or oblique positions in relation with each other, characterized by a spring having one end connected with said last mentioned strip and the other end adjustably connected along said rack.

3. A display device and household rack, comprising a plurality of parallel and laterally spaced right angle triangularly shaped members having parallel altitudes disposed in a common plane, a pair of superimposed support strips extending across and pivotally connected with the apexes and the right angle ends of the bases of said triangularly shaped members, means for attaching one of said support strips on a wall or other object, a strip extending across and pivotally connected with the acute angle end portions of the bases of said triangularly shaped members, a plurality of pegs or support elements disposed between adjacent faces of said triangularly shaped members and mounted on one of said faces, and means for holding said triangularly shaped members in right angle or oblique positions in relation with each other, comprising a tension spring, means fixedly attaching one end of said spring to the strip mounted at the acute angle end portions of said triangularly shaped members, and means adjustably attaching the other end of said spring to the first means mounted at the right angle end portions of said triangularly shaped members to be moveable to one side or the other of the fixedly attached end of said spring.

4. A display device and household rack, comprising a plurality of parallel and laterally spaced right angle triangularly shaped members having parallel altitudes disposed in a common plane, a pair of superimposed support strips extending across and pivotally connected with the apexes and the right angle ends of the bases of said triangularly shaped members, means for attaching one of said support strips on a wall or other object, a strip extending across and pivotally connected with the acute angle end portions of the bases of said triangularly shaped members, a plurality of pegs or support elements disposed between adjacent faces of said triangularly shaped members and mounted on one of said faces, and means for holding said triangularly shaped members in right angles or oblique positions in relation with each other, comprising a tension spring, means fixedly attaching one end of said spring to strips mounted at the acute angle end portions of said triangularly shaped members, and means adjustably attaching the other end of said spring to the first means mounted at the right angle end portions of said triangularly shaped members to be moveable to one side or the other of the fixedly attached end of said spring, said latter means, comprising a block slidably mounted in a groove formed in the first means mounted at the right angle end portions of said triangularly shaped members and to which the said end of said spring is attached, said groove being extended to both sides of the fixedly attached end of said spring, and means securing said block in position in either end of said groove.

5. A display device and household rack, comprising a plurality of parallel and laterally spaced right angle triangularly shaped members having parallel altitudes disposed in a common plane, a pair of superimposed support strips extending across and pivotally connected with the apexes and the right angle ends of the bases of said triangularly shaped members, means for attaching one of said support strips on a wall or other object, a third strip extending across and pivotally connected with the acute angle end portions of the bases of said triangularly shaped members, a plurality of pegs or support elements disposed between adjacent faces of said triangularly shaped members and mounted on one of said faces, and means for holding said triangularly shaped members in right angle or oblique positions in relation with each other, comprising a tension spring, means fixedly attaching one end of said spring to the said third strip mounted at the acute angle end portions of said triangularly shaped members, and means adjustably attaching the other end of said spring to the first means mounted at the right angle end portions of said triangularly shaped members to be moveable to one side or the other of the fixedly attached end of said spring, said latter means, comprising a block slidably mounted in a groove formed in the first means mounted at the right angle end portions of said triangularly shaped members and to which the said end of said spring is attached, said groove being extended to both sides of the fixedly attached end of said spring, and means securing said block in position in either end of said groove, said latter means comprising a set screw threadedly engaged through said block and abutting the base wall of said groove.

MANFRED ROSENBLATT.